UNITED STATES PATENT OFFICE.

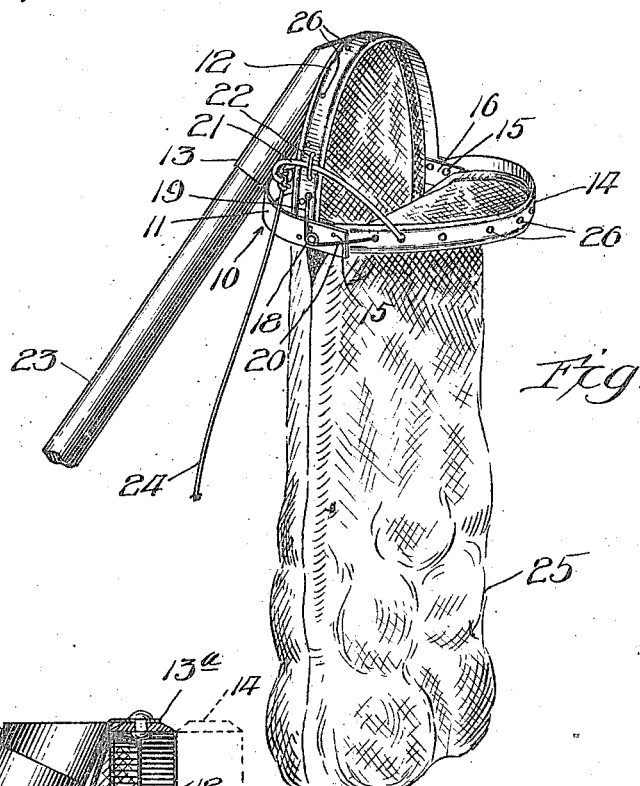
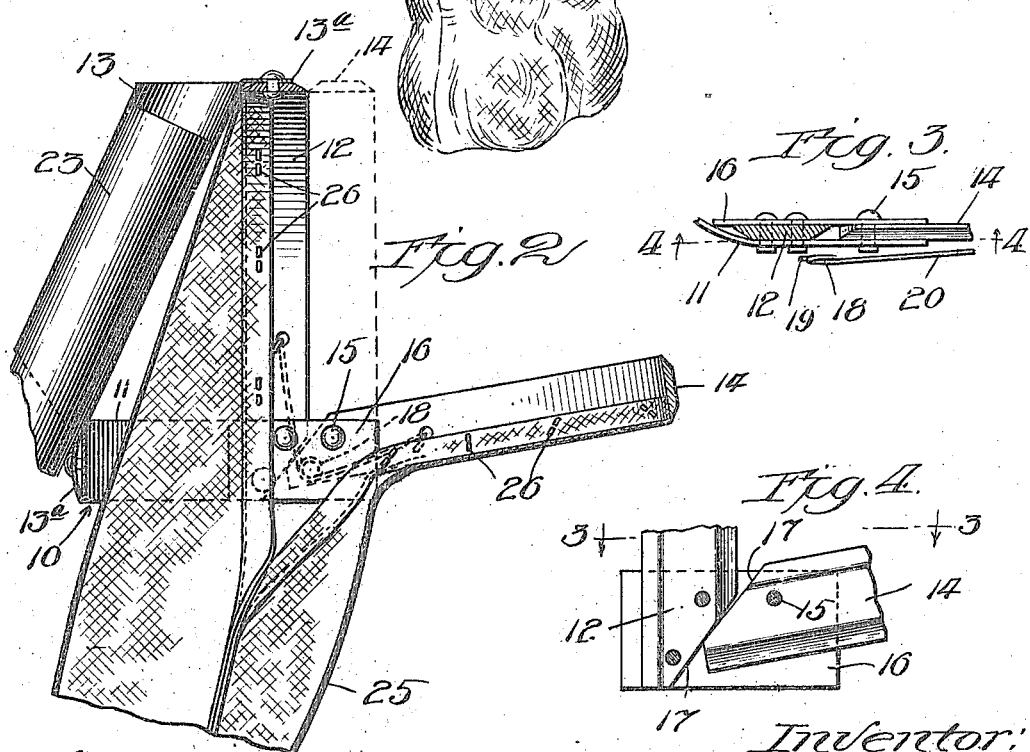
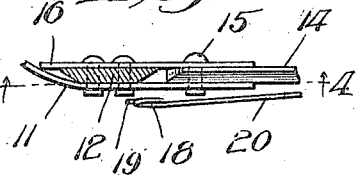
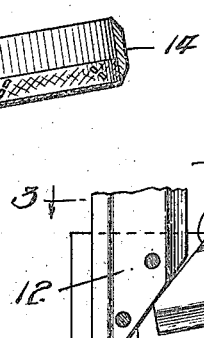

HERMAN GIELOW, OF PALATINE, ILLINOIS.

FRUIT-PICKER.

1,255,596.

Specification of Letters Patent.

Patented Feb. 5, 1918.

Application filed September 24, 1917. Serial No. 192,845.

*To all whom it may concern:*

Be it known that I, HERMAN GIELOW, a citizen of the United States, and a resident of Palatine, county of Cook, and State of Illinois, have invented certain new and useful Improvements in Fruit-Pickers, of which the following is declared to be a full, clear, and exact description.

This invention relates to fruit pickers, and its object is to provide a cheap, simple and efficient device for gathering fruit, such as apples, pears, oranges, peaches and the like. Many fruit pickers have been devised heretofore, but they are complicated in construction, difficult to operate and liable to get out of order. The present invention is designed to obviate all of said objectionable features, and to provide a fruit picker that is easily operated, capable of withstanding the ordinary wear and tear, and requiring very little if any care. The invention consists in the several novel features hereinafter fully set forth and claimed.

The invention is clearly illustrated in the accompanying drawing, in which:

Figure 1, is a perspective view of a fruit picker embodying a simple form of the present invention; Fig. 2, is a central vertical section through the picker, the handle and bag being partly broken away; Fig. 3, is a horizontal section taken on line 3—3 of Fig. 4; and Fig. 4, is a view partly in side elevation and partly in vertical section, the line of section being indicated at 4—4 in Fig. 3.

Referring to said drawing, 10, designates the frame-work of the device, which comprises a bowed piece of strap iron 11, a second bowed piece of strap iron 12, arranged in a plane at right angles to the plane of the strip 11, and having its ends riveted thereto adjacent the ends of said strip 11. A handle socket 13, preferably constructed of sheet metal, having its body portion curled up into tubular form, is riveted or otherwise secured to the strips 11, 12, thereby providing a braced frame of light construction. The end portions of the handle socket are in the form of tongues 13ª, bent back from the tubular portion, and riveted to the strips 11, 12.

The bowed strip 12, also acts as one of the jaws of the picker, and coöperates with a swinging jaw 14, to sever the stems of the fruit. Said swinging jaw 14, may comprise a piece of strip iron similar to the strip 12, and having the same bowed form. Said movable jaw 14, is pivotally connected to the frame member 11, by rivets 15, and is capable of swinging from the position shown in full lines in Fig. 2, to that shown in dotted lines in the same figure. For the purpose of greater strength and rigidity, short strips 16, are riveted to the frame members 11, 12, on the inner side thereof, and extend parallel with the end portions of the member 11, and the stationary jaw 12, and movable jaw 15, are held between the strips 11, 16, as shown. The ends of the jaws are beveled off, as at 17 (see Fig. 4), and form stops limiting the downward or opening movement of the movable jaw. Springs 18, having arms 19, 20, secured in the jaws 11, 14, are employed for swinging the movable jaw into open position, and a curved link 21, pivotally secured in the movable jaw 14, and extending through an eye 22, secured on the stationary jaw 12, is employed for swinging the movable jaw into contact with the stationary jaw. A pole or handle 23, inserted in the handle socket 13, and a rope or cord 24, secured in an eye on the free end of the link 21, furnish means whereby the device may be raised a considerable distance above the person using it, and operated by the rope or cord. The meeting edges of the jaws 11, 15, are beveled off to provide sharp edges.

A pouch or bag 25, is secured to the jaws 12, 15, and furnishes a receptacle for receiving the fruit as it is removed from the trees. For convenience, the bag is made short, and one from 12 to 20 inches in length serves the purpose because a short bag is easier handled among the branches of the trees, and is not likely to overhang the branches when the upper end is being moved among the branches. The upper ends of the two sides of the bag are round and fastened to the inside of the jaws 12, 15, by rivets 26, or other fastening devices, as desired. Conveniently the bag is made of a long strip of material such as canvas doubled upon itself at the middle and having its two side edges sewed together to a point adjacent the rounded upper edges, where the two sides are free from each other to permit the opening and closing of the jaws.

In use, the operator grasps the handle and rope or cord, raises the picker to the fruit and brings the stationary jaw alongside the fruit with the movable jaw in position to swing up to inclose the fruit between the two sides of the bag at the jaws. Then he jerks the cord downward, thereby drawing the link 21, through the eye 22, thereby swinging the movable jaw up against the stationary jaw and severing the stem of the fruit. If the stem is not completely severed by the action of the jaws, the fruit may be pulled off the branch by pulling down on the handle, and at the same time keeping the jaws closed by pulling down on the rope. The jaws may be opened sufficiently to enable the device to gather several pieces of fruit at one time. For instance, when a number of apples, oranges or the like are clustered together on a branch, all may be taken into the device at once, the jaws closed, and all removed from the limb by pulling down on the handle and cord. When the bag is filled with fruit, it is lowered and the fruit emptied into a suitable receptacle.

I claim as new, and desire to secure by Letters Patent:

1. A fruit picker comprising two bowed frame members rigidly secured together, the one extending in a plane transverse to the plane of the other, a handle socket extending between and rigidly secured to the central portions of both frame members, said handle acting also as a brace between said frame members, one of said frame members also acting as a stationary jaw, a bowed, movable jaw pivotally secured to one of said frame members, and movable from an open position to a closed one contacting with the stationary jaw, springs between said jaws for swinging the movable jaw into open position, a jaw actuating member and a receptacle having its open upper end secured to said jaws.

2. A fruit picker comprising two bowed frame members rigidly secured together, the one extending in a plane transverse to the plane of the other, a handle socket extending between and rigidly secured to said frame members, one of said frame members also acting as a stationary jaw, a bowed, movable jaw pivotally secured to one of said frame members, and movable from an open position to a closed one contacting with the stationary jaw, springs between said jaws for swinging the movable jaw into open position, an eye on the stationary jaw, a jaw actuating link secured to the movable jaw, and extending through said eye, and a connection extending from said link.

3. A fruit picker comprising two bowed strips extending transversely of each other, and the ends of one rigidly secured to the ends of the other, a handle socket extending between and rigidly secured to said strips, one of said strips acting as a stationary jaw, a bowed strip pivotally secured to one of said first mentioned strips, and acting as a movable jaw coöperating with said stationary jaw, said movable jaw being spring pressed toward its open position, a jaw closing link secured to said movable jaw and slidably secured in an eye on the stationary jaw, a handle secured in said socket, a flexible connection secured to the free end of the link, and a bag having its open upper end secured to said jaws.

HERMAN GIELOW.

Copies of this patent may be obtained for five cents each, by addressing the "Commissioner of Patents, Washington, D. C."